(12) United States Patent
Ueda et al.

(10) Patent No.: US 7,121,947 B2
(45) Date of Patent: Oct. 17, 2006

(54) COUPLING DEVICE

(75) Inventors: Motohiko Ueda, Okazaki (JP); Yasuo Tabuchi, Toyoake (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/130,339

(22) Filed: May 16, 2005

(65) Prior Publication Data

US 2005/0239555 A1 Oct. 27, 2005

Related U.S. Application Data

(62) Division of application No. 10/413,261, filed on Apr. 14, 2003, now Pat. No. 7,066,819.

(30) Foreign Application Priority Data

Apr. 16, 2002 (JP) ............................. 2002-113514
Mar. 4, 2003 (JP) ............................. 2003-057078

(51) Int. Cl.
  *F16D 9/04* (2006.01)
(52) U.S. Cl. .......................... 464/10; 474/94
(58) Field of Classification Search ................. 464/32, 464/10; 474/90, 94; 417/223, 319; 418/69; 192/56.5; F16D 9/04
See application file for complete search history.

(56) References Cited

U.S. PATENT DOCUMENTS

| 2,964,931 A | 12/1960 | Sorenson |
| 4,871,296 A | 10/1989 | Laessle et al. |
| 5,219,273 A * | 6/1993 | Chang ...................... 417/319 |
| 5,800,137 A | 9/1998 | Eitai et al. |
| 2003/0130044 A1 | 7/2003 | Kanai et al. |
| 2004/0166944 A1 | 8/2004 | Nosaka et al. |

* cited by examiner

*Primary Examiner*—Greg Binda
(74) *Attorney, Agent, or Firm*—Harness, Dickey & Pierce, PLC

(57) ABSTRACT

A coupling device has a pulley that receives rotational torque from an engine. The torque is transmitted to a shaft through a hub and a one-way clutch. A torque limiter is screwed on the shaft to fasten the inner ring of the one-way clutch onto the shaft. The torque limiter has a breakable portion. The torque is directly transmitted from the inner ring to the shaft when the torque is normal. If the torque exceeds the tightening torque of the torque limiter, the inner ring begins to slide and rotate, and drives the torque limiter in a tightening direction. As the torque limiter is tightened additionally, the tensile stress on the breakable portion is increased. Then, the breakable portion breaks and is separated in axial direction so that the coupling device disconnects torque transmission.

31 Claims, 5 Drawing Sheets

COUPLING DEVICE

CROSS REFERENCE TO RELATED APPLICATIONS

This application is a divisional of U.S. patent application Ser. No. 10/413,261 filed on Apr. 14, 2003 now U.S. Pat. No. 7,066,819 which is based on Japanese Patent Applications No. 2002-113514 filed on Apr. 16, 2002 and No. 2003-57078 filed on Mar. 4, 2003 the contents of which are incorporated herein by reference.

BACKGROUND OF THE INVENTION

1. Field of the Invention

The present invention relates to a coupling device for transmitting torque.

2. Description of Related Art

JP-A-8-319945 discloses a compressor with coupling device. The coupling device transmits torque. The coupling device is formed as a pulley for receiving rotational torque from a belt. The coupling device is also capable of functioning as a torque limiter to disconnect torque transmission when the torque exceeds a predetermined threshold torque. The coupling device is formed with a weak portion that breaks to disconnect torque transmission when the torque exceeds the threshold. The weak portion is provided on a disk portion of the pulley by forming an annular groove and through holes on the groove in regular intervals. The through hole weakens and adjusts the strength of the disk. This configuration is advantageous for providing a coupling device with simple structure and at less cost. However, contrary, it is difficult to design and manufacture products having precision break torque.

For instance, a breakable portion expected to be broken has to be designed to have a certain strength that is capable to breaking at a certain break torque, threshold torque. However, it is difficult to determine the strength of the breakable portion. For example, the fatigue failure may breaks the breakable portion even if it is applied with a lower toque than the expected break torque.

Therefore, the maximum torque applied to the breakable portion, that is a permissible torque T2, should be set below a torque indicated by T1/S, where T1 is the break torque and S is a safety margin. In this case, the coupling device will be useless since the required transmissible torque T3 exceeds the permissible torque T2 when a ratio T1/T3 is lower than the safety ratio S. The required transmissible torque T3 may be referred to as a torque to be transmitted via the coupling device under an actual application.

In general, it is necessary to set a greater value in the safety margin S as it becomes difficult to carry out a theoretical stress analysis of the object since condition of stress applied to the abject requires complicated analysis. In contrast, if the stress applied to the breakable portion can be estimated precisely, it is possible to set a smaller value in the safety margin S, and to increase the permissible torque T2.

The structure disclosed in JP-A-8-319945 is expected to be broken primarily by a shearing force, that is the tangential stress. Since the shearing force tends to intense to a surface, it is difficult to estimate a distribution of the stress precisely. Therefore, a trial and error method is required to determine appropriate size and material of the breakable portion.

SUMMARY OF THE INVENTION

It is an object of the present invention to provide an improved structure of a coupling device.

It is another object of the present invention to provide a coupling device with a breakable portion that is mainly broken by the tensile stress generated by an excessive torque.

It is another object of the present invention to provide a coupling device with a breakable portion that is almost free from the metal fatigue failure caused by the fluctuation of the transmitted torque.

It is another object of the present invention to provide a coupling device that is capable of disconnecting at a predetermined torque without loosening threads and the metal fatigue failure.

According to a first aspect of the present invention, a coupling device is disposed between a drive member and a driven member. The coupling device comprises a torque limiter that is rotatable with the drive member. The torque limiter has a thread formed in a direction to generate a thrust force when the thread is rotated in the same direction as a direction of a torque transmitted from the drive member to the driven member, and a breakable portion having a tensile strength that breaks at a predetermined level of the thrust force.

In this structure, the breakable portion is capable of breaking by the tensile force generated by the thread. Therefore, it is possible to set the break torque precisely.

The coupling device may additionally comprise a one-way clutch that prevents the thread from loosening by a torque in a counter direction. It is possible to prevent a loosening of the thread even there is a torque in a direction counter to the direction from the drive member to the driven member.

The breakable portion may have the tensile strength that is less than the other portions of the torque limiter.

The torque limiter may be fixed on the drive member. In this case, the thread may be adapted to fasten the drive member on the driven member in a slidable manner. According to this structure, the drive member and the driven member provide a frictional contact. The frictional contact transmits the transmitted torque from the drive member to the driven member until the transmitted torque prevails the frictional torque. If the transmitted torque prevails the frictional torque, the drive member is enabled to slide on and rotate relative to the driven member. Therefore, the torque limiter is almost free from the transmitted torque and the fluctuation of the transmitted torque during the frictional contact transmits the transmitted torque. Therefore, it is possible to prevent the breakable portion from the metal fatigue failure caused by the fluctuation of the transmitted torque.

The thread may be formed to make the drive member come in contact with the driven member in a manner that the drive member directly transmits torque to the driven member when the transmitted torque is less than a predetermined level, and that the drive member is enabled to rotate with respect to the driven member when the transmitted torque exceeds the predetermined level.

The torque limiter may be formed in a cylindrical shape. In this case, the torque limiter has a first portion to be fixed on the drive member, and a second portion to be threaded on the driven member. The breakable portion is disposed between the first and second portions. It is possible to provide a compact structure of the torque limiter.

The torque limiter may be threaded on the drive member until the torque limiter and the drive member comes in an axial contact. It is possible to fix the torque limiter on the drive member firmly.

The coupling device may further comprise a member that urges the torque limiter opposite to the tightening direction of the thread. It is possible to reduce noise and friction after the torque limiter is broken.

The drive member may include a first one-way clutch that selectively transmits a torque from a primary drive source to the driven member, and a second one-way clutch that selectively transmits a torque from a secondary drive source to the driven member. In this structure, the torque limiter is disposed to be rotated by the torque from the primary or secondary drive source.

According to the present invention the torque limiter has a contact surface disposed to contact the driven member, and the thread is provided to generate a trust force in a contacting direction for press-contacting the driven member and the contact surface when the thread is rotated in the same direction as a direction of torque transmitted from the drive member to the driven member. Further, the breakable portion is disposed between the contact surface and a part of the thread, and the breakable portion breaks when the torque is larger than a predetermined value. Accordingly, the breakable portion accurately breaks at the torque larger than the predetermined torque.

Preferably, the contact surface of the torque limiter contacts one end of the driven member, at least one of the contact surface and the one end of the driven member has a film on its surface, and the film restricts a variation in coefficient of friction when the one end of the driven member contacts the contact surface. Alternatively, a spacer has a surface that restrict a variation in coefficient of friction, and the spacer is disposed between the contact surface of the torque limiter and the driven member. Therefore, the breaking is not affected by friction, and the breakable portion accurately breaks at a predetermined torque level.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
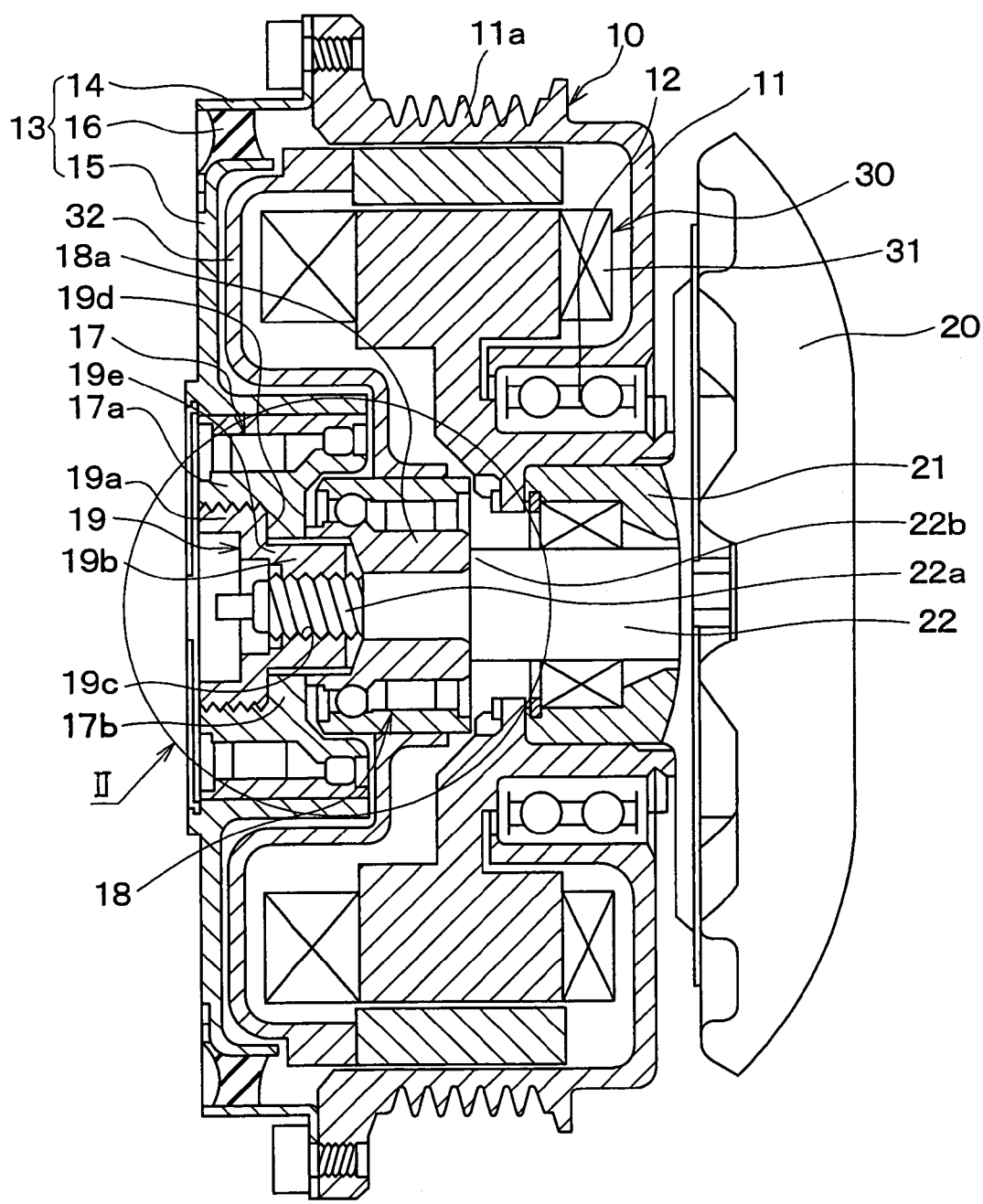
FIG. 1 is a cross sectional view of a coupling device according to a first embodiment of the present invention.
Figure 2:
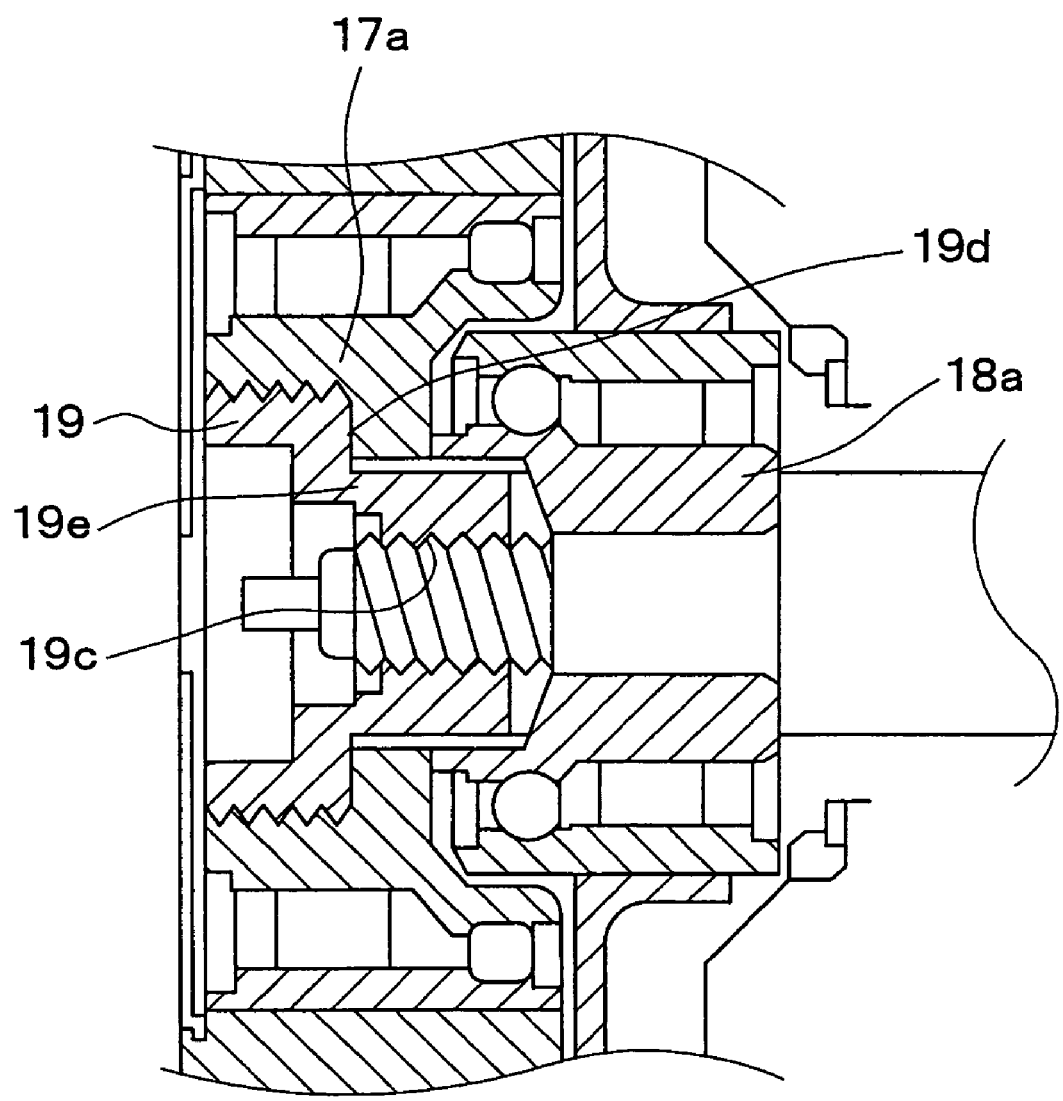
FIG. 2 is an enlarged cross sectional view of the coupling device according to the first embodiment of the present invention.

Referring to FIG. 1, the present invention is applied to a coupling device 10 between an engine for propelling a vehicle and a rotary machine mounted on the vehicle. The rotary machine is a compressor 20 for a refrigerant cycle. The refrigerant cycle is a component of a vehicular climate control system. The coupling device 10 is attached on a shaft 22 of the compressor 20. The coupling device 10 is provided with a pulley 11 and an electric motor 30.

The pulley 11 is made of metal and is formed in a double cylindrical structure. The pulley 11 has an outer surface 11a with a poly-V groove and is rotatably supported on a front housing 21 of the compressor 20 via a radial bearing 12. The pulley 11 is coupled with a crankshaft of the engine via a poly-V belt. The pulley 11 is rotated during the engine is running.

A hub 13 is fixed on the pulley 11. The hub 13 has an outer member 14, an inner member 15 and a damper 16. The outer member 14 is formed in an annular shape and has an L-shaped cross section. The outer member 14 is bolted on the pulley 11. The outer member 14 is made of a metal plate such as a cold rolled steel plate, and is manufactured by a pressing process. The inner member 15 is fixed on the shaft by a fixing means for fixing the inner member 15 on the shaft by the thrust force applied by threads. The damper 16 joins the outer member 14 and the inner member 15 for transmitting the torque. The damper 16 is made of elastic material such as a rubber, e.g., a chlorinated isobutylene-isoprene (Cl-IIR) rubber, and is joined with the inner and outer member 14, 15 by vulcanization.

The damper 16 works as a shock absorber for absorbing torque fluctuation. The damper 16 also works as an urging member for urging the inner member 15 in an axial direction to separate an inner ring 17a from an inner ring 18a.

A first one-way clutch 17 is press fitted into a radial center of the inner member 15. The hub 13 and the first one-way clutch 17 provide a transmission path from the pulley 11 to the shaft 22. An outer ring of the first one-way clutch 17 is fixed with the inner member 15. An inner ring 17a of the first one-way clutch 17 is coupled with the shaft 22 by two means.

The first is an axial frictional coupling. The inner ring 17a is frictionally coupled with the shaft 22 via a contact with the inner ring 18a.

The second is a thread coupling. The inner ring 17a is coupled with the shaft via a torque limiter 19 by screwing the torque limiter 19 onto the shaft. The inner ring 17a is fixed on torque limiter 19 via a thread coupling and an axial contact on an outer cylindrical portion 19a of a torque limiter 19. The torque limiter 19 has an axial annular surface 19d on an axial end of the outer cylindrical portion 19a so that the surface 19d comes in contact with an inwardly extending flange portion 17b of the inner ring 17a. The threads on the inner ring 17a and the outer cylindrical portion 19a are formed in a direction to tighten themselves when the engine drives the pulley 11. In other words, the threads are formed in a direction to tighten themselves in response to a torque transmitted through the first one-way clutch 17 to the torque limiter 19. Therefore, the inner member 15 and the torque limiter 19 are rotated together when the engine is running.

The torque limiter 19 further has an inner cylindrical portion 19b. The inner cylindrical portion 19b is threaded on the shaft 22. The inner cylindrical portion 19b has a female thread 19c on its inner surface. The shaft 22 has a male thread 22a on its outer surface. The threads 19c, 22a are formed in a direction to tighten themselves when the torque limiter 19 is tightened in a direction that is the same as a torque direction transmitted from the hub 13 to the shaft 22. Therefore, the threads 19c, 22a generate a thrust force when the threads 19c, 22a are tightened. The threads 19c, 22a are primarily tightened with a torque that is greater than the required transmissible torque T3 and is less than the break torque T1.

The torque limiter 19 has a breakable portion 19e between two portions 19a, 19b. The first portion 19a is coupled with the pulley 11 via the inner ring 17a and the hub 13. The other portion 19b is coupled with the shaft 22 via the threads. The breakable portion 19e is also located between the surface 19d and the inner cylindrical portion 19b. The breakable portion 19e is formed thinner than the other portion of the torque limiter 19. The breakable portion 19e has less tensile strength against the thrust force, the force in an axial direction, than that on the other portions of the torque limiter 19. The breakable portion 19e has a tensile strength that is breakable at a predetermined level of the thrust force. The torque limiter 19 is integrally formed with sintered metallic composite and has a coating of molybdenum disulfide at least on the female thread 19c.

In this embodiment, it is desirable to keep frictional coefficients constant on the male thread 22a, the female thread 19c and contacting surfaces of the inner ring 19d, since the break torque of the breakable portion 19e and the transmissible torque of the coupling device may be affected with the frictional coefficients on these portions. In order keep expected functions, the male thread 22a, the female thread 19c, the surface 19d and a contact surfaces between the inner ring 17a and the outer ting 18s are coated with the molybdenum disulfide coating. Alternatively, another rust preventive coating may be used instead of the molybdenum disulfide coating.

The electric motor 30 is integrated in the coupling device 10 as an internal driving power source for driving the shaft 22. The electric motor 30 is configured as an outer rotor type DC brushless motor. The electric motor 30 has a stator 31 with coils and a rotor 32 with magnets. The stator 31 is fixed on the front housing 21 of the compressor 20. The rotor 32 is disposed outside the stator 31 and is rotatably supported on the shaft 22. The rotor 32 is supported on the shaft 22 via a second one-way clutch 18. The second one-way clutch 18 selectively transmits a torque in the same direction as that transmitted by the first one-way clutch.

The second one-way clutch 18 is fixed on an outer surface of the shaft 22 between the first one-way clutch 17 and a stepped portion 22b of the shaft 22. The second one-way clutch 18 has an inner ring 18a. The one end of the inner ring 18a comes in contact with the stepped portion 22b, and the other end of the inner ring 18a comes in contact with axially facing end surface of the inner ring 17a. Therefore the inner ring 18a provides an extension member of the shaft 22 to receive the inner ring 17a, which is directly tightened axially by threading the torque limiter 19.

In an assembling step, the torque limiter 19 is screwed into the inner ring 17a and onto the shaft 22 like a nut. The torque limiter 19 is further screwed onto the shaft 22 after the surface 19d comes in contacts with the flange portion 17b. The damper 16 enables the inner ring 17a to move axially. As the torque limiter 19 is screwed, the torque limiter 19 applies the thrust force on the inner ring 17a and the inner ring 18a. Then, the inner ring 17a and the inner ring 18a are come in contact with the stepped portion 22b and pressed onto the stepped portion 22b. The torque limiter 19 is tightened with a torque that is greater than the required transmissible torque T3 and is less than the break torque T1. As a result, the inner ring 17a, the inner ring 18a and the torque limiter 19 are fastened and fixed on the shaft 22 by the thrust force, an axial tightening force. However, a contact between the inner ring 17a and the inner ring 18a, and a contact between the inner ring 18a and the shaft 22 are merely frictional, therefore these components are still rotatable each other in a sliding manner when a predetermined level of rotational torque is applied.

In an operation of the coupling device 10, the coupling device 10 transmits a torque from the pulley 11 to the shaft 22, and in addition to or alternatively the electric motor 30 drives the shaft 22. The pulley 11 receives rotational drive torque from the engine. The torque is transmitted to the shaft 22 through the damper 16, the inner member 15, the first one-way clutch 17 and the inner ring 18a.

When the transmitted torque is lower than the tightening torque of the torque limiter 19, the inner ring 17a rotate with the shaft 22 with no slip. Therefore, the breakable portion 19e only receives a stable stress caused by the tightening force of the torque limiter 19 and the thrust force generated in accordance with the tightening force. The breakable portion 19e receives very little or no stress caused by the fluctuation of the transmitted torque.

Next, if the transmitted torque exceeds the tightening torque, the inner ring 17a rotates with respect to the shaft 22 while sliding on the inner ring 18a or sliding together with the inner ring 18a on the stepped portion 22b. This rotation of the inner ring 17a screws the torque limiter 19 onto the shaft 22, and advances the inner cylindrical portion 19b in the axial direction. At this time, the inner cylindrical portion 19b is advanced in the axial direction, however, the outer cylindrical portion 19a is kept on the same axial position. Therefore, the tensile stress on the breakable portion 19e is increased as the inner ring 17a rotates with respect to the shaft 22. In order to adjust the friction between the inner ring 17a and the inner ring 18a, the contacting portion therebetween is narrowed.

Then, if the inner ring 17a rotates in a certain angle with respect to the shaft 22, the tensile stress caused by screwing and tightening the torque limiter 19 breaks the breakable portion 19e. The breakage of the breakable portion 19e separates the torque limiter 19 into two portions, the outer cylindrical portion 19a and the inner cylindrical portion 19b. The inner ring 17a is separated from the inner ring 18a due to the axial urging force of the damper 16. As a result, the torque transmission from the pulley 11 to the shaft 22 is disconnected.

The second one-way clutch 18 prevents torque transmission from the shaft 22 to the rotor 32 during the shaft 22 is driven by the pulley 11. The first one-way clutch 17 prevents torque transmission from the shaft 22 to the pulley 11 during the electric motor 30 drives the shaft 22.

In this embodiment, the pulley 11, the hub 13 and the first one-way clutch 18 provide a drive side member. The shaft 22 and the inner ring 18a are a driven side member. The engine is a primary drive source. The electric motor 30 is a secondary drive source.

According to the embodiment, since the transmitted torque is not directly applied on the breakable portion 19e, the breakable portion 19e receives very little or no stress caused by the fluctuation of the transmitted torque. The stress on the breakable portion 19e is not fluctuated in accordance with the transmitted torque. Therefore, the breakable portion 19e is prevented from the metal fatigue failure caused by repeated cycling of the load.

In another aspect, the breakable portion 19e is designed to break in response to the tensile stress caused by the thrust force rather than the shearing stress. Since the tensile stress shows a substantially uniform distribution over a cross section, it is possible to estimate the stress distribution on the breakable portion 19e precisely and to estimate the break torque precisely. As a result, it is possible to reduce or eliminate the trial and error type development, and to reduce cost.

In another aspect, since the torque limiter 19 is provided as an independent component, it is possible to adjust the break torque precisely. Further, since the breakable portion 19e is formed in a cylindrical shape having a diameter substantially the same as the shaft 22, it is possible to make the torque limiter 19 in small and less material.

In another aspect, since the torque limiter 19 is axially separated into two portions, it is possible to reduce or prevent noise or undesirable friction after the breakage of the breakable portion 19e. In addition, a separating means for separating the portions 19a, 19b is provided by the damper 16, therefore it is possible to reduce the number of parts.

In another aspect, the first and second one-way clutch 17, 18 prevents the torque limiter 19 from loosening.

The present invention can be applied to the other coupling device, for example, to a coupling device that has no electric motor. Any type of one-way clutch may be used as the first and second one-way clutch 17, 18, for example, a roller type and a sprag type can be used. The present invention can be applied to a coupling device that has a pulley portion and an electromagnetic clutch for controlling the torque transmission.

Figure 3:
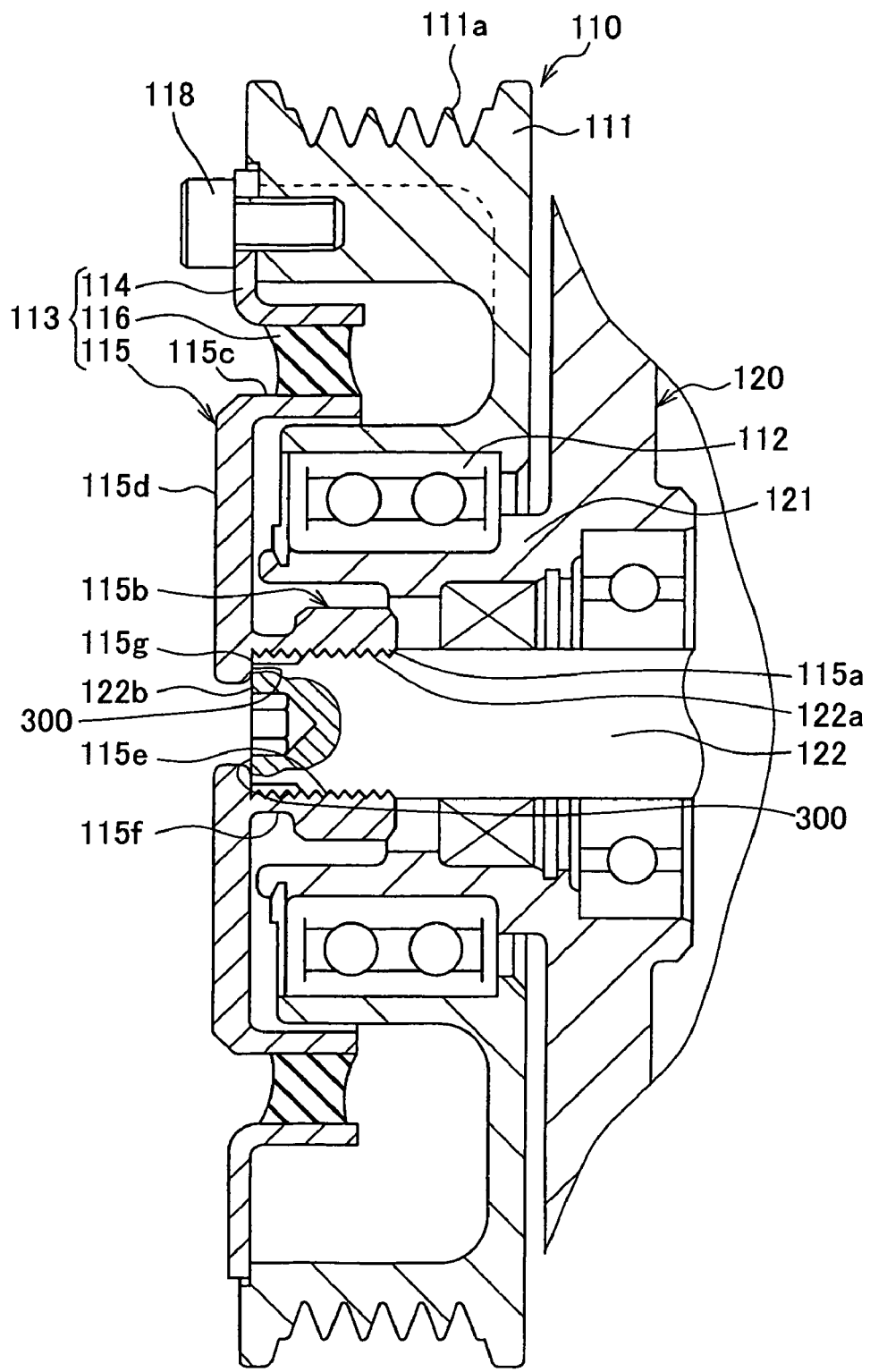
FIG. 3 is a cross sectional view of a coupling device according to a second embodiment of the present invention.

FIG. 3 shows a second embodiment of a coupling device according to the present invention. The coupling device has a simplified structure compared with the first embodiment. The coupling device 110 has some components explained in the first embodiment, therefore the same last two digits of reference numbers are used to indicate the same or similar components as the first embodiment.

The shaft 122 is rotatably supported on the housing 120. The pulley 111 is rotatably supported on an inner portion 121 of the housing 120 via the bearing 112. The pulley 111 is coupled with the hub 113 including the outer member 114, the inner member 115 and the damper 116. For example, the hub 113 and the pulley 111 are tightly fastened by a screw member 118. The inner member 115 has a disk portion 115d, an outer cylindrical portion 115c and an inner cylindrical portion 115b. The disk portion 115d has a seat portion 115g resting on an end 122b of the shaft 122. The inner cylindrical portion 115b has a thicker portion 115e and a thinner portion 115f as the breakable portion. The thinner portion 115f is located between the seat portion 115g and the thicker portion 115e. A thread 115a (i.e., screw portion) is formed on the inner cylindrical portion 115b. A thread 122a (i.e., screw portion) is formed on the shaft 122.

In the second embodiment, a film 300 made of molybdenum disulfide is formed on at least one of the seat portion 115g and the end 122b of the shaft 122, so that a variation in the coefficient of friction between the seat portion 115g and the end 122b of the shaft 122 is reduced or restricted.

The threads 115a, 122a are formed in a right hand or left hand fashion so as to thrust the seat surface 115g onto the end 122b of the shaft 122, the contacting direction, when the inner cylindrical portion 115b is rotated and tightened in a direction that is the same as a torque direction transmitted from the hub 113 to the shaft 122. Therefore, the thrust pressure acting on the seat surface 115g increases as the threads 115a, 122a are tightened. The threads 115a, 122a are primarily tightened with a torque that is greater than the required transmissible torque and is less than the break torque.

The second embodiment may be used as a pulley for a refrigerant compressor of a vehicular refrigerant cycle.

However, since the second embodiment has no one-way clutch, there is the possibility that the threads 115a, 122a may be loosened if a torque opposite to the torque direction from the hub 113 to the shaft 122 is applied to the threads 115a, 122a.

According to the second embodiment, the thinner portion 115f receives the shearing stress caused by a tightening torque applied when tightening the inner cylindrical portion 115b and the tensile stress caused by a thrust force generated by the threads 115a, 122a. When the transmitted torque exceeds the primary tightening torque, the threads 115a, 122a are tightened. The threads 115a, 122a propel the inner cylindrical portion 115b in accordance with the transmitted torque and a time period for which the transmitted torque exceeds the predetermined torque where the predetermined torque creates a predetermined level of thrust force. Therefore, the tensile stress is gradually increased and then breaks the thinner portion 115f.

Figure 4:
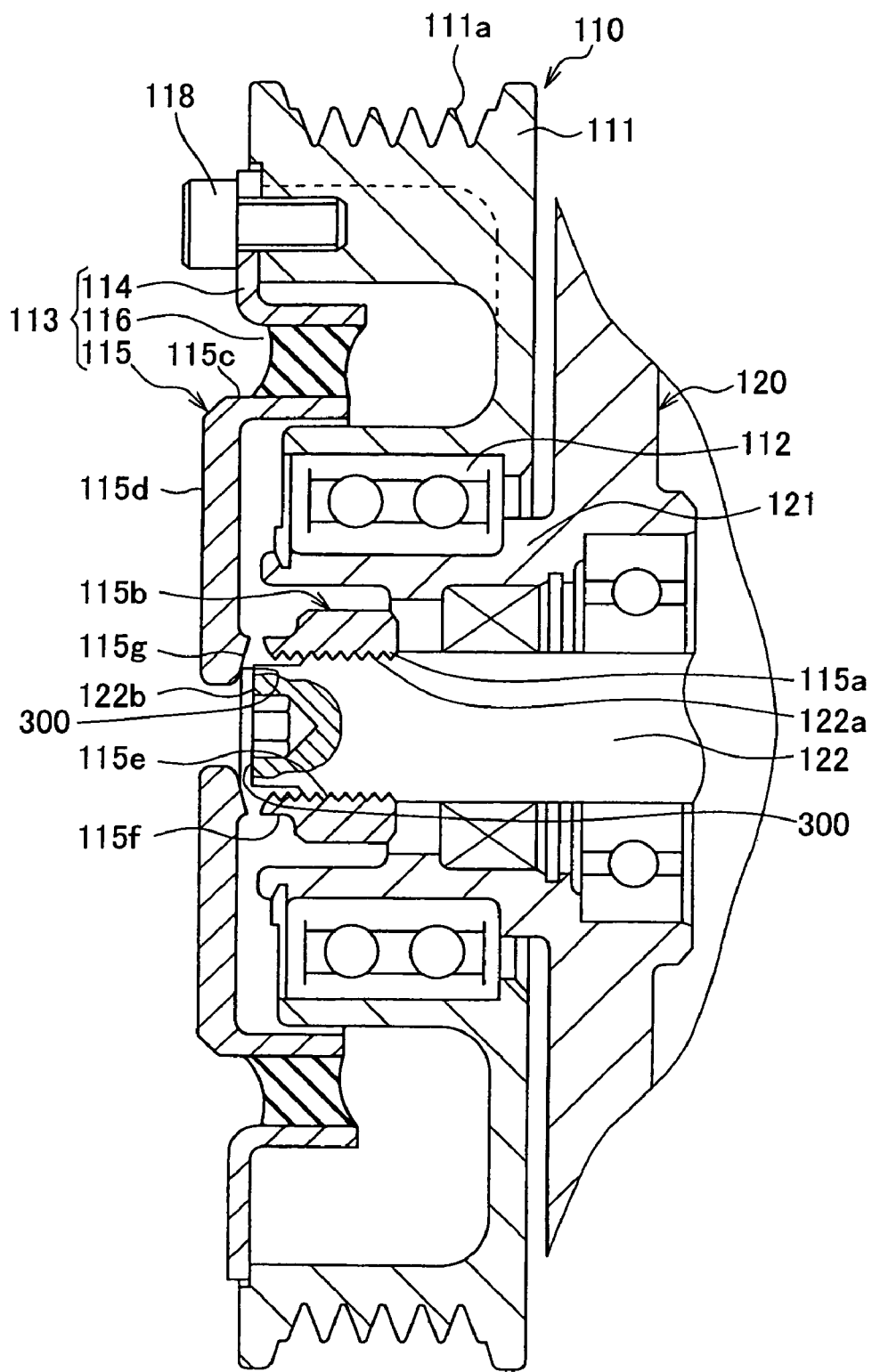
FIG. 4 is a cross sectional view showing the coupling device when a breakable portion (thinner portion) breaks, according to the second embodiment.

The thinner portion 115f receives very little amount of the fatigue stress caused by a fluctuation of the transmitted torque. Therefore, the thinner portion 115f avoids metal fatigue failure since there is a direct contact between the seat portion 115g and the end 122b and a variation of the transmitted torque does not affect the stress on the thinner portion 115f. As a result, it is possible to break the thinner portion 115f only when an excessive torque is applied. FIG. 4 shows a state where the thinner portion 115f is broken when a thrust force larger than predetermined torque is applied to the thinner portion 115f.

According to the second embodiment of the present invention, the seat portion 115g is used as a contact surface that contacts the end 122b of the shaft 122, and the thinner portion 115f, the breakable portion, is disposed between a part of the thread 115a and the seat portion 115g, the contact surface. In the second embodiment, the thread 115a is also provided on the thinner portion 115f. However, the thread 115a provided on the thinner portion 115f can be omitted. In this case, the thinner portion 115f can be positioned between the thread 115a and the seat portion 115g.

In the second embodiment, the damper 116 can be used as a separation member that is disposed to separate the disk portion 115d and the like from the shaft 122 when the thinner portion 115f breaks. Because the damper 116 is an elastic member for applying elastic force to at least one of the disk portion 115d and the shaft 122, it can prevent noise in the broken portion of the thinner portion 115f from being caused, and prevent an unnecessary friction resistance from being caused. As shown in FIG. 4, the elastic force of damper 116 separates or moves the disk portion 115d from the shaft 122 in a direction opposite the contacting direction when the thinner portion 115f breaks.

Figure 5:
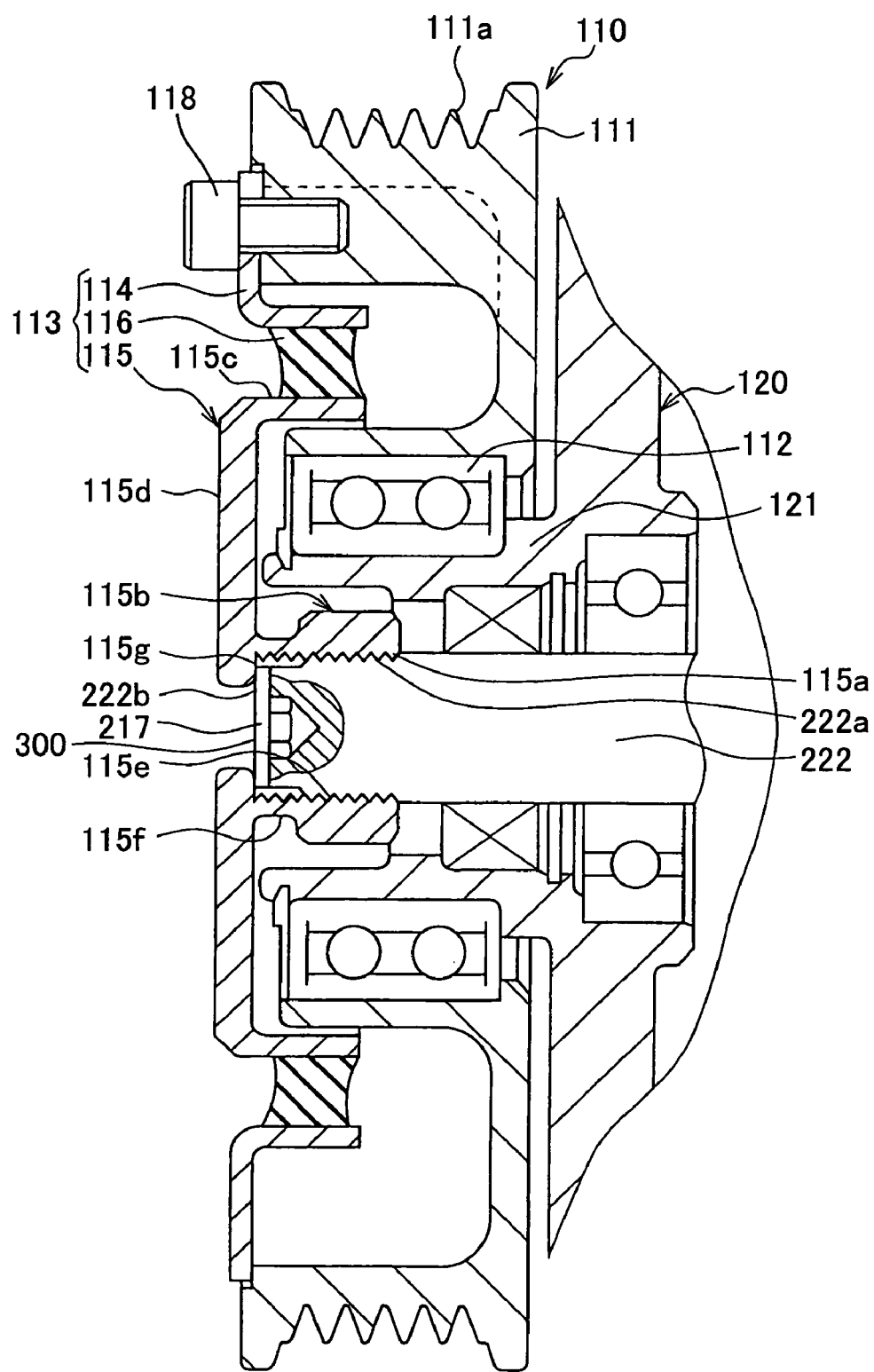
FIG. 5 is a cross sectional view showing a coupling device according to a third embodiment of the present invention.

A third embodiment of the present invention will be now described with reference to FIG. 5. In the above-described second embodiment, a film 300 made of molybdenum disulfide is formed on the seat portion 115g and the end 122b of the shaft 122, so that the coefficient of friction between the seat portion 115g and the end 122b of the shaft 122 is made stable. However, in the third embodiment, as shown in FIG. 5, a spacer 217, on which a film 300 of molybdenum disulfide is formed, is disposed between the disk portion 115d and the end 222b of the shaft 222. Therefore, the spacer 217 restricts a variation in the coefficient of friction.

Although the present invention has been described in connection with the preferred embodiments thereof with reference to the accompanying drawings, it is to be noted that various changes and modifications will be apparent to those skilled in the art.

For example, in the above-described second and third embodiments, a female screw can be formed as the thread 115a on the inner peripheral surface of the cylindrical portion 115b (the hub 113), and a male screw can be formed as the thread 122a, 222a on a driven rotational member (i.e., shaft 122, 222). Conversely, the male screw can be formed as the thread 115a on the cylindrical portion 115b (i.e., the hub 113), and the female screw can be formed as the thread 122a, 222a on the driven rotational member (i.e., shaft 122, 222).

In the above-described second and third embodiments, the hub 113 is directly connected to the shaft 122, 222. However, a driven rotational member rotated integrally with the shaft 122, 222 may be provided. In this case, the hub 113 of the drive rotational member is connected to the driven rotational member that is rotated integrally with the shaft 122, 222.

In the above-described second and third embodiments, the cylindrical portion 115b including the breakable portion (i.e., the thinner portion 115f) is made of a sintered metal. However, the cylindrical portion 115b including the thinner portion 115f can be made of the other material such as ceramic. Further, the thread 115a (screw portion) is provided substantially on an entire inner surface of the cylindrical portion 115b including the thinner portion 115f. However, the thread 115a can be omitted on the inner surface of the thinner portion 115f, among the cylindrical portion 115b.

Such changes and modifications are to be understood as being included within the scope of the present invention as defined in the appended claims.

What is claimed is:

1. A coupling device comprising:
   a pulley which rotates when a torque is applied thereto;
   a driven rotation member;
   a hub through which the torque applied to the pulley is transmitted to the driven rotation member, the hub including an outer peripheral portion fixed to the pulley, an inner peripheral portion fixed to the driven rotation member, and an elastic member connecting the outer peripheral portion and the inner peripheral portion, the inner peripheral portion including a wall portion and a contact portion;
   the wall portion of the inner peripheral portion having a first thread through which the wall portion of the inner peripheral portion is connected to a second thread of the driven rotation member; and
   a component disposed between the contact portion of the inner peripheral portion and an axial tip end surface of the driven rotation member; wherein:
   the component has flat faces in the axial direction on which the contact portion of the inner peripheral portion and the axial tip end surface of the driven rotation member come in contact, respectively, the component providing friction contacts with both the contact portion of the inner peripheral portion and the axial tip end surface of the driven rotation member;
   a contact surface pressure of the contact portion of the inner peripheral member and one flat face of the component and a contact surface pressure of the tip end surface of the driven rotation member and the other flat face of the component increases when the hub fastens the first and second threads by the transmitted torque;
   the inner peripheral portion includes a breakable portion connected to the wall portion and the contact portion;
   the breakable portion breaks when the transmitted torque is larger than a value; and
   a sectional area of the breakable portion is smaller than a sectional area of the wall portion.

2. A coupling device according to claim 1, wherein the elastic member is disposed to separate the contact portion from the tip end surface of the driven rotation portion when the breakable portion breaks.

3. A coupling device according to claim 1, wherein the elastic member is disposed to apply an elastic force to the contact portion in a direction reducing the contact surface pressure of the contact portion.

4. A coupling device according to claim 3, wherein the elastic member transmits the torque from the pulley to the driven rotation member.

5. A coupling device according to claim 1, wherein the component has means for restricting a variation in coefficient of friction.

6. A coupling device according to claim 1, wherein the contact portion and the tip surface of the driven rotation portion are disposed to have a space therebetween after the breakable portion is broken.

7. A coupling device according to claim 1, wherein the breakable portion is a sintered metal.

8. A coupling device according to claim 1, wherein the outer peripheral portion is fastened to the pulley through a fastening member.

9. A coupling device according to claim 8, wherein the fastening member is at least a bolt.

10. A coupling device according to claim 1, wherein:
    the inner peripheral portion is formed into a cylinder portion together with the wall portion and the breakable portion; and
    the contact portion is an inner surface of the cylinder portion.

11. A coupling device according to claim 1, wherein:
    the first thread and the second thread are formed to propel the wall portion and the contact portion in the axial direction when the hub fastens the first thread and the second thread by the transmitted torque;
    the component provides friction contacts with both the contact portion and the driven rotation member to enable relative rotation between the contact portion and the driven rotation member when the torque reaches an excessive torque, and to disable the relative rotation to transmit a torque less than the excessive torque from the drive member to the driven rotation member; and
    the breakable portion is provided to be breakable when the wall portion is propelled by a predetermined distance relative to the contact portion.

12. A coupling device according to claim 1, wherein the component has a film which restricts a variation in a coefficient of friction.

13. A coupling device according to claim 12, wherein the film is made of molybdenum disulfide.

14. A coupling device comprising:
    a pulley which rotates when a torque is applied thereto;
    a driven rotation member;
    a hub through which the torque applied to the pulley is transmitted to the driven rotation member, wherein the hub includes an inner cylinder portion having a wall portion defining a first thread connected to a second thread defined by the driven rotation member, an outer cylinder portion connected outwardly to the inner cylinder portion through a disk portion, an outer peripheral portion connected to the pulley, and an elastic member connected to the outer peripheral portion and the outer cylinder portion;

a component disposed between a contact portion provided and an axial tip end surface of the driven rotation member; wherein:

the component has flat faces in the axial direction on which the contact portion of the inner cylinder portion and the axial tip end surface of the driven rotation member come in contact, respectively, the component providing friction contacts with both the contact portion of the inner cylinder portion and the axial tip end surface of the driven rotation member;

a contact surface pressure of the contact portion of the inner cylinder member and one flat face of the component and a contact surface pressure of the tip end surface of the driver rotation member and the other flat face of the component increases when the hub fastens the first and second threads by the transmitted torque;

the inner cylinder portion has a breakable portion connected to the wall portion and the contact portion;

the breakable portion breaks when the transmitted torque is larger than a value; and a sectional area of the breakable portion is smaller than a sectional area of the wall portion.

15. A coupling device according to claim 14, wherein the elastic member is disposed to separate the contact portion from the tip end surface of the driven rotation portion when the breakable portion breaks.

16. A coupling device according to claim 14, wherein the elastic member is disposed to apply an elastic force to the contact portion in a direction reducing the contact surface pressure of the contact portion.

17. A coupling device according to claim 16, wherein the elastic member transmits the torque from the pulley to the driven rotation member.

18. A coupling device according to claim 14, wherein the component has means for restricting a variation in coefficient of friction.

19. A coupling device according to claim 14, wherein the contact portion and the tip surface of the driven rotation portion are disposed to have a space therebetween after the breakable portion is broken.

20. A coupling device according to claim 14, wherein the breakable portion is made of metal.

21. A coupling device according to claim 14, wherein the outer peripheral portion is fastened to the pulley through a fastening member.

22. A coupling device according to claim 21, wherein the fastening member is at least a bolt.

23. A coupling device according to claim 14, wherein:

the first thread and the second thread are formed to propel the wall portion and the contact portion in the axial direction when the hub fastens the first thread and the second thread by the transmitted torque;

the component provides friction contacts with both the contact portion and the driven rotation member to enable relative rotation between the contact portion and the driven rotation member when the torque reaches an excessive torque, and to disable the relative rotation to transmit a torque less than the excessive torque from the drive member to the driven rotation member; and the breakable portion is provided to be breakable when the wall portion is propelled by a predetermined distance relative to the contact portion.

24. A coupling device according to claim 14, wherein the component has a film which restricts a variation in a coefficient of friction.

25. A coupling device according to claim 24, wherein the film is made of molybdenum disulfide.

26. A coupling device comprising;

a driven rotation member;

a drive member which rotates when a torque is applied thereto, and through which the torque is transmitted to the driven rotation member; and a component disposed between said driven rotation member and said drive member; wherein said drive member comprises:

a wall portion having a first thread through which the wall portion is connected to a second thread provided on the driven rotation member;

a contact portion provided to contact the component in an axial direction; and a breakable portion provided between the wall portion and the contact portion; wherein:

the first thread and the second thread are formed to propel the wall portion and the contact portion in an axial direction when the drive member fastens the first thread and the second thread by the transmitted torque;

the component has flat faces in the axial direction, on which the contact portion and the driven rotation member contact respectively, and provides friction contacts with both the contact portion and the driven rotation member to enable relative rotation between the contact portion and the driven rotation member when the transmitted torque reaches an excessive torque, and to disable the relative rotation to transmit a torque less than the excessive torque from the drive member to the driven rotation member, and wherein the breakable portion is provided to be breakable when the wall portion is propelled by a predetermined distance relative to the contact portion.

27. A coupling device according to claim 26, wherein the drive member comprises a pulley, an outer portion fixed to the pulley, an inner portion fixed to the driven rotation member by the wall portion and an elastic member connecting the outer portion and the inner portion.

28. A coupling device according to claim 26, wherein the component restricts a variation in the coefficient of friction, between the driver rotation member and the contact portion.

29. A coupling device according to claim 26, wherein the component has a film which restricts a variation in a coefficient of friction.

30. A coupling device according to claim 29, wherein the film is made of molybdenum disulfide.

31. A coupling device according to claim 26, wherein a sectional area of the breakable portion is smaller than a sectional area of the wall portion.

* * * * *